US012193976B1

(12) United States Patent
Brinkley-Strickland

(10) Patent No.: US 12,193,976 B1
(45) Date of Patent: Jan. 14, 2025

(54) BIODEGRADABLE CASKET ASSEMBLY

(71) Applicant: Nora Brinkley-Strickland, Evansville, IN (US)

(72) Inventor: Nora Brinkley-Strickland, Evansville, IN (US)

( * ) Notice: Subject to any disclaimer, the term of this patent is extended or adjusted under 35 U.S.C. 154(b) by 0 days.

(21) Appl. No.: 18/218,972

(22) Filed: Jul. 6, 2023

(51) Int. Cl.
*A61G 17/007* (2006.01)
*A61G 17/02* (2006.01)
*A61G 17/04* (2006.01)
*A61G 17/08* (2006.01)

(52) U.S. Cl.
CPC ......... *A61G 17/007* (2013.01); *A61G 17/034* (2017.05); *A61G 17/041* (2016.11); *A61G 17/042* (2016.11); *A61G 17/08* (2013.01)

(58) Field of Classification Search
CPC .. A61G 17/007; A61G 17/042; A61G 17/041; A61G 17/034; A61G 17/08; A61G 17/0073; A61G 17/004; A61G 2203/90; E04H 13/001; E04H 13/003
See application file for complete search history.

(56) References Cited

U.S. PATENT DOCUMENTS 1,270,543 A * 6/1918 Navarrete et al. .... A61G 17/007 27/7
5,035,032 A * 7/1991 Nutting .............. A61G 17/0073 27/7
5,111,559 A * 5/1992 Mohr ................. A61G 17/0073 27/7
5,701,642 A * 12/1997 Order ...................... E04H 13/00 27/2
D423,753 S 4/2000 Huber
7,665,195 B1 * 2/2010 Vazquez-Perez ...... A61G 17/08 27/1
8,112,851 B1 * 2/2012 Hughes ................ A61G 17/041 27/27
D659,942 S * 5/2012 Tretchell .......................... D99/1
8,499,425 B2 8/2013 Roberts
8,776,333 B2 7/2014 Van Den Bogart
D856,629 S 8/2019 Reynolds
11,723,827 B1 * 8/2023 Parks-Root ........ A61G 17/0136 27/7
2004/0032047 A1 2/2004 Hou
2009/0278280 A1 * 11/2009 Requena Olcina .. A61G 17/007 264/241

(Continued)

FOREIGN PATENT DOCUMENTS

BR 202018001428 U2 * 8/2019
EP 2329805 A2 * 6/2011 ........... A61G 17/007

(Continued)

*Primary Examiner* — William L Miller

(57) ABSTRACT

A biodegradable casket assembly for burying remains of a deceased individual includes a casket which is comprised of pressed cannabis thereby facilitating the casket to decompose when the casket is buried with human remains. An insert is insertable into the casket and the insert is comprised of a rigid material such that the insert impart structural rigidity to the casket. A lid is comprised of pressed cannabis thereby facilitating the lid to decompose when the lid and the casket are buried with human remains. A plurality of rods is each of the rods is coupled to and extends away from the casket such that each of the rods can be gripped for carrying the casket.

10 Claims, 4 Drawing Sheets

(56) References Cited

U.S. PATENT DOCUMENTS

| | | | | |
|---|---|---|---|---|
| 2011/0041302 | A1* | 2/2011 | Bates | A61G 17/0136 27/7 |
| 2011/0089605 | A1* | 4/2011 | Olcina | A61G 17/007 264/241 |
| 2012/0042488 | A1* | 2/2012 | Hsu | A61G 17/0073 27/4 |
| 2012/0102693 | A1 | 5/2012 | Royal | |
| 2013/0036583 | A1* | 2/2013 | Skov | A61G 17/004 27/14 |
| 2019/0024401 | A1* | 1/2019 | Souders | D21H 27/00 |
| 2020/0206057 | A1* | 7/2020 | Wainman | A61G 17/042 |
| 2022/0125659 | A1* | 4/2022 | Marin | B65G 7/12 |
| 2023/0080744 | A1* | 3/2023 | Trammell | A61G 17/007 27/2 |
| 2023/0210176 | A1* | 7/2023 | Freelander | A24F 40/42 131/329 |
| 2024/0000645 | A1* | 1/2024 | Sanchez Zequera | A61G 17/032 |

FOREIGN PATENT DOCUMENTS

| | | | | | |
|---|---|---|---|---|---|
| GB | 2596144 | A | * | 12/2021 | A61G 17/0073 |
| WO | WO-2005034828 | A1 | * | 4/2005 | A61G 17/00 |
| WO | WO-2022113026 | A1 | * | 6/2022 | A61G 17/004 |
| ZA | 201707803 | A | * | 2/2019 | |

* cited by examiner

BIODEGRADABLE CASKET ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to casket devices and more particularly pertains to a new casket device for burying a deceased individual. The device includes a casket and a lid each comprised of pressed cannabis such that the casket and the lid will decompose. The device includes a rigid insert that can be positioned in the casket. The device includes a plurality of ornaments for decorating a gravesite and an urn, comprised of pressed cannabis, for containing ashes of a deceased individual.

(2) Description of Related Art Including Information Disclosed Under 37 CFR 1.97 and 1.98

The prior art relates to casket devices including a casket which is comprised of any perishable material. The prior art discloses a casket comprised of a crushed agricultural material, a filling material and an adhesive to bind the filling material and the crushed agricultural material together. The prior art discloses a method of manufacturing a casket which is constructed of a vegetable material. The prior art discloses an ornament design for a cremation urn which has a height that is substantially less than a diameter of the urn.

BRIEF SUMMARY OF THE INVENTION

An embodiment of the disclosure meets the needs presented above by generally comprising a casket which is comprised of pressed cannabis thereby facilitating the casket to decompose when the casket is buried with human remains. An insert is insertable into the casket and the insert is comprised of a rigid material such that the insert impart structural rigidity to the casket. A lid is comprised of pressed cannabis thereby facilitating the lid to decompose when the lid and the casket are buried with human remains. A plurality of rods is each of the rods is coupled to and extends away from the casket such that each of the rods can be gripped for carrying the casket.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
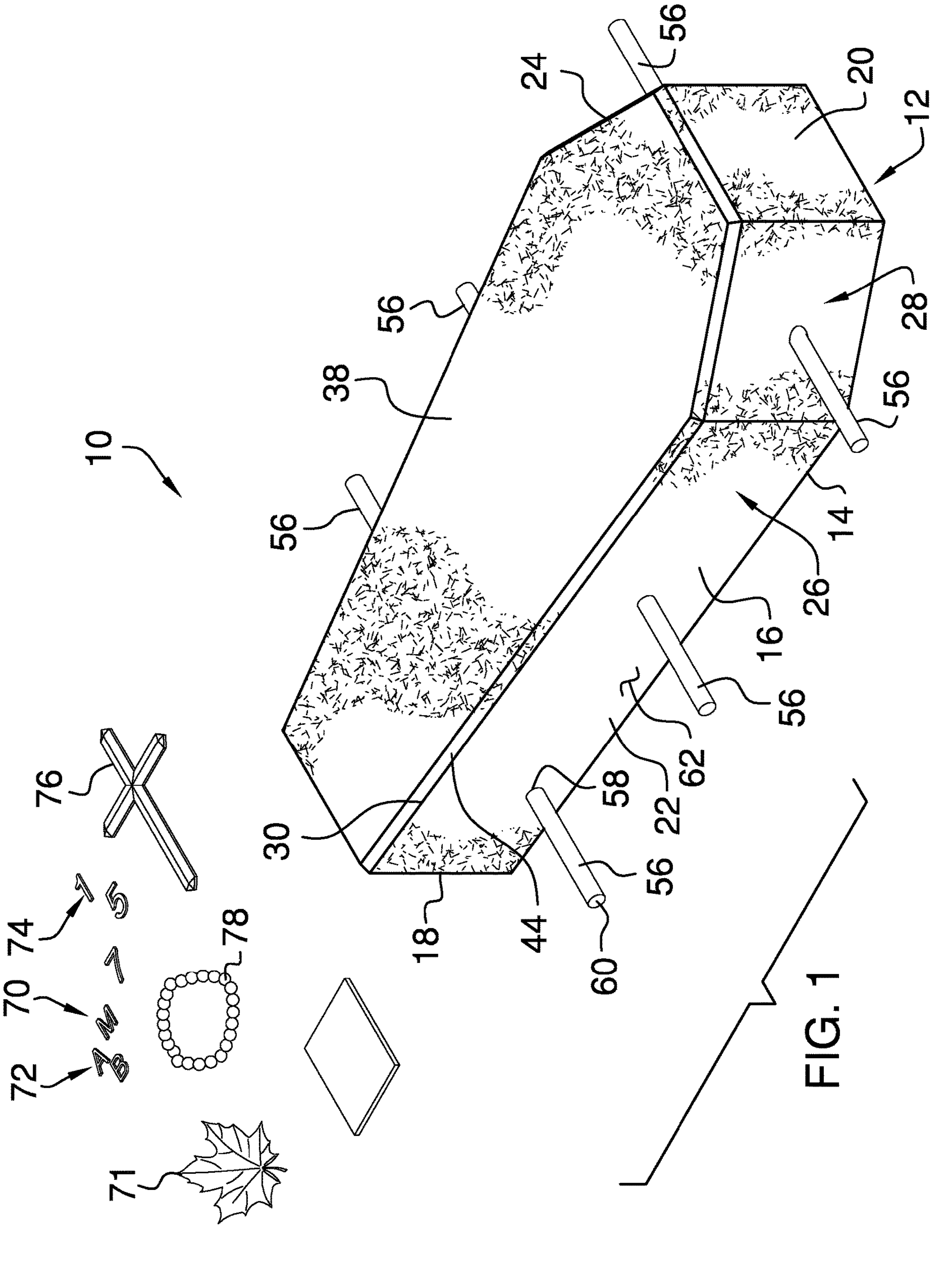
FIG. 1 is a perspective in-use view of a biodegradable casket assembly according to an embodiment of the disclosure.
Figure 2:
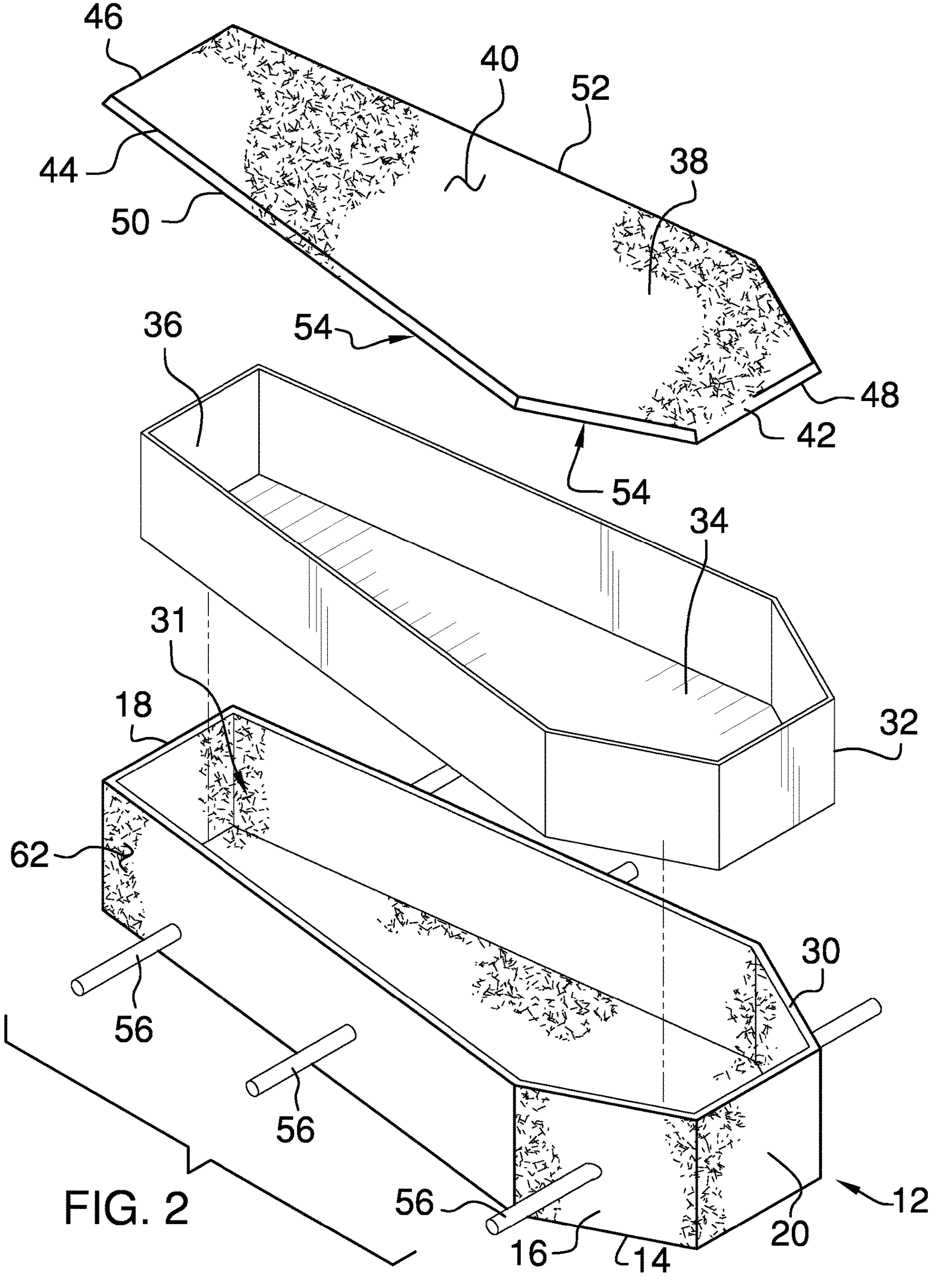
FIG. 2 is an exploded view of casket, an insert and a lid of an embodiment of the disclosure.
Figure 3:
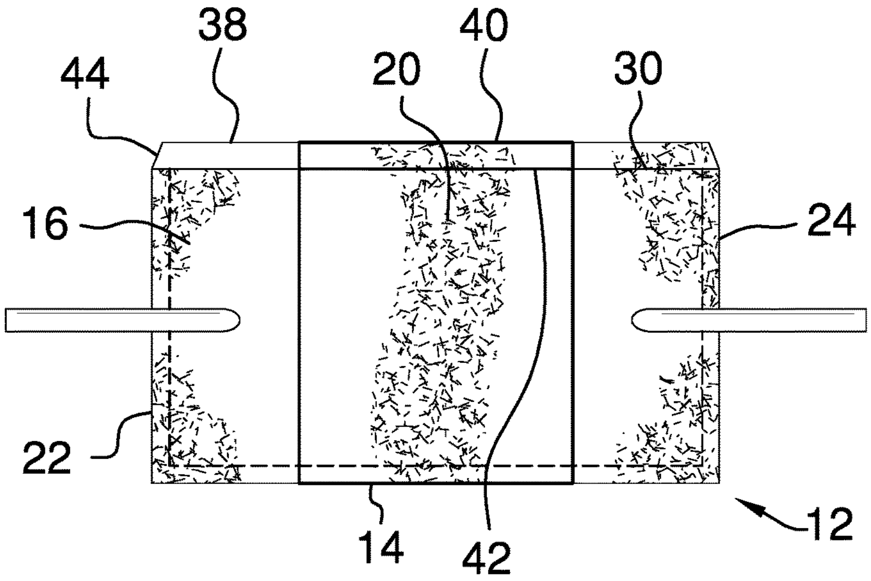
FIG. 3 is a front view of casket of an embodiment of the disclosure.
Figure 4:
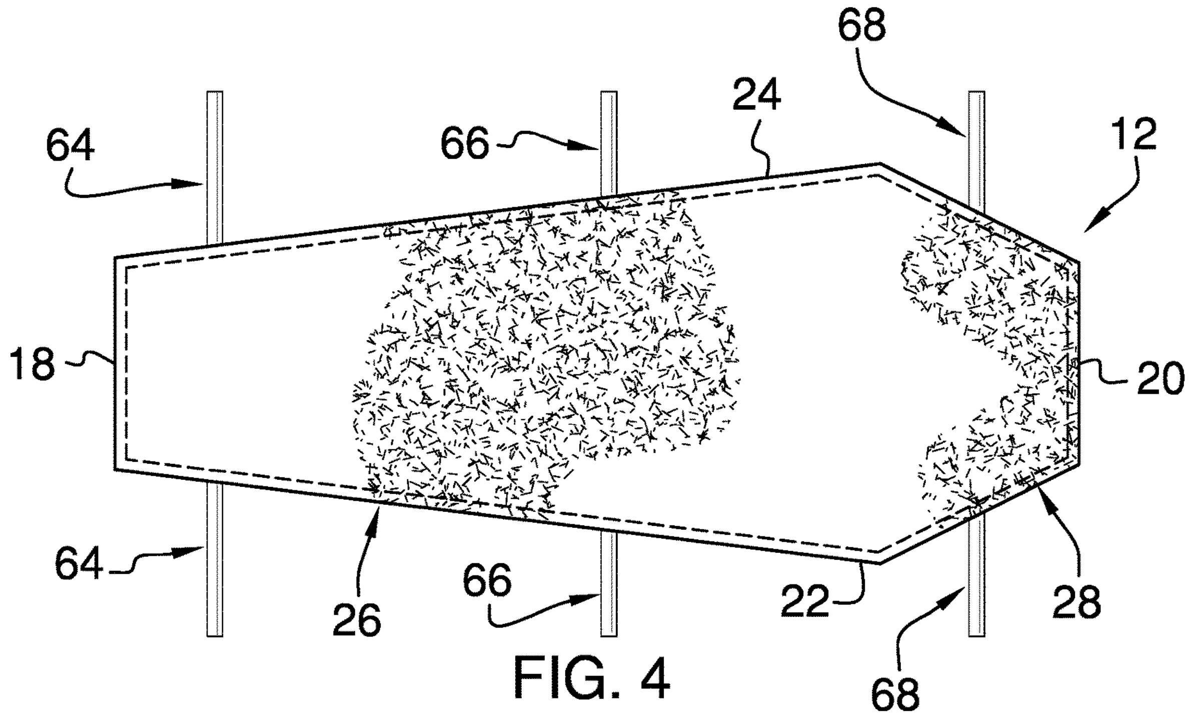
FIG. 4 is a top view of casket of an embodiment of the disclosure.

With reference now to the drawings, and in particular to FIGS. 1 through 5 thereof, a new casket device embodying the principles and concepts of an embodiment of the disclosure and generally designated by the reference numeral 10 will be described.

As best illustrated in FIGS. 1 through 5, the biodegradable casket assembly 10 generally comprises a casket 12 that is comprised of pressed cannabis thereby facilitating the casket 12 to decompose when the casket 12 is buried with human remains. The casket 12 has a bottom wall 14 and a perimeter wall 16 extending upwardly from the bottom wall 14, and the perimeter wall 16 has a rear side 18, a front side 20, a first lateral side 22 and a second lateral side 24. Each of the first lateral side 22 and the second lateral side 24 has a first portion 26 angling outwardly from the rear side 18. Additionally, each of the first lateral side 22 and the second lateral side 24 has a second portion 28 angling inwardly between the first portion 26 and the front side 20. The first portion 26 has a length that is greater than the second portion 28, and the perimeter wall 16 has a distal edge 30 with respect to the bottom wall 14 to define an opening 31 into the casket 12.

An insert 32 is provided that is insertable into the casket 12 and the insert 32 is comprised of a rigid material such that the insert 32 imparts structural rigidity to the casket 12. The rigid material may comprise steel or other metallic alloy. The insert 32 has a basal wall 34 and an exterior wall 36 extending upwardly from the basal wall 34, and the exterior wall 36 conforms to the perimeter wall 16 of the casket 12 such that the insert 32 is inhibited from moving when the insert 32 is positioned in the casket 12.

A lid 38 is provided which is comprised of pressed cannabis thereby facilitating the lid 38 to decompose when the lid 38 and the casket 12 are buried with human remains. The lid 38 has a top surface 40, a bottom surface 42 and a perimeter edge 44 extending between the top surface 40 and the bottom surface 42, and the perimeter edge 44 has a back side 46, a front side 48, a first sidelong side 50 and a second sidelong side 52. Each of the first sidelong side 50 and the second sidelong side 52 has angled portions 54 which conform to the first portion 26 and the second portion 28 of a respective one of the first lateral side 22 and the second lateral side 24 of the casket 12. The perimeter edge 44 angles inwardly between the bottom surface 42 and the top surface 40, and the bottom surface 42 rests on the distal edge of the perimeter wall 16 of the casket 12 when the lid 38 is positioned on the casket 12.

A plurality of rods 56 each of the rods 56 is coupled to and extends away from the casket 12 to be gripped for carrying the casket 12. Each of the rods 56 has a coupled end 58 and a free end 60, and the coupled end 58 of each of the rods 56 is coupled to an outside surface 62 of the perimeter wall 16 of the casket 12. The plurality of rods 56 includes a set of first rods 64, a set of second rods 66 and a set of third rods 68. Each of the first rods 64 is positioned on the first portion 26 of a respective one of the first lateral side 22 and the second lateral side 24 of the perimeter wall 16, and each of the first rods 64 is positioned proximate the rear side 18 of the perimeter wall 16.

Each of the second rods 66 is positioned on the first portion 26 of a respective one of the first lateral side 22 and the second lateral side 24 of the perimeter wall 16. Additionally, each of the second rods 66 is positioned closer to the second portion 28 of the respective first lateral side 22 and the second lateral side 24 than the rear side 18 of perimeter wall 16. Each of the third rods 68 is positioned on the second portion 28 of a respective one of the first lateral side 22 and the second lateral side 24, and each of the third rods 68 is centrally positioned proximate the front side 20 of the perimeter wall 16. Each of the first rods 64, the second rods 66 and the third rods 68 has a unique length with respect to each other such that the free end 60 of each of the rods 56 that are positioned on the first lateral side 22 of the perimeter wall 16 are aligned with each other. Additionally, the free end 60 of each of the rods 56 that are positioned on the second lateral side 24 of the perimeter wall 16 are aligned with each other.

A plurality of ornaments 70 is each comprised of pressed cannabis thereby facilitating the ornaments 70 to decompose after a sufficient duration of time. The plurality of ornaments 70 includes a plurality of sets of ornaments 70 and each of the sets of ornaments 70 has a unique structure with respect to each other. Furthermore, respective ones of the ornaments 70 that are chosen by a user are positionable at a gravesite at which the casket 12 and the insert 32 and the lid 38 are buried to enhance the ornamental appearance of the gravesite. As is most clearly shown in FIG. 1, the plurality of ornaments 70, may include a maple leaf 71, letters of the alphabet 72, numbers 74, religious symbols 76, mock jewelry 78 and other types of ornaments.

Figure 5:
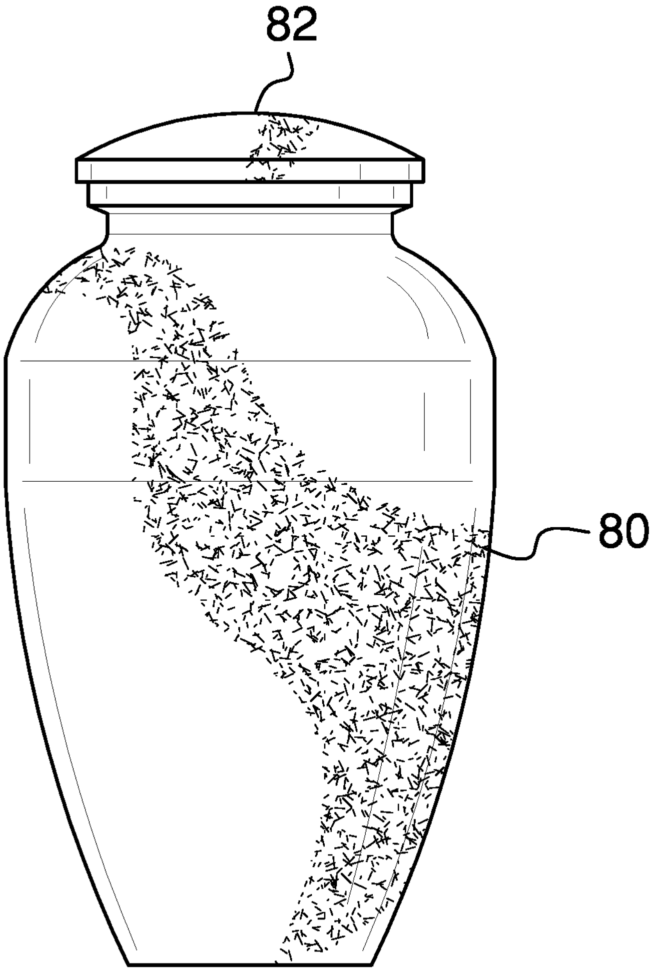
FIG. 5 is a front view of an urn of an embodiment of the disclosure.

As is most clearly shown in FIG. 5, an urn 80 is comprised of pressed cannabis thereby facilitating the urn 80 to decompose after a sufficient duration of time. The urn 80 can contain ashes of a cremated individual. The urn 80 includes a lid 82 that is comprised of pressed cannabis to facilitate the lid 38 to decompose after a sufficient duration of time. The urn 80 may be styled in a variety of different means to suit the tastes of various people.

In use, the insert 32 is placed into the casket 12 to contain the human remains and the lid 38 is positioned on the casket 12. Each of the rods 56 is gripped by pall bearers to position the casket 12 in a grave. Each of the casket 12 and the lid 38 decompose after a sufficient duration of time to reduce the environment impact of traditional casket 12 materials and burial ceremonies. Ornaments 70 chosen by the user can be positioned at the grave site to memorialize the deceased and to reflect the user's thoughts and feelings toward the deceased. Furthermore, the urn 80 can be employed to contain the deceased's ashes when the deceased is cremated.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A biodegradable casket assembly for facilitating buried human remains to decompose and degrade, said assembly comprising:

a casket being comprised of pressed cannabis thereby facilitating said casket to decompose when said casket is buried with said human remains;

an insert being insertable into said casket, said insert being comprised of a rigid material such that said insert imparts structural rigidity to said casket;

a lid being comprised of pressed cannabis thereby facilitating said lid to decompose when said lid and said casket are buried with said human remains; and a plurality of rods, each of said rods being coupled to and extending away from said casket wherein each of said rods is configured to be gripped for carrying said casket;

wherein said casket has a bottom wall and a perimeter wall extending upwardly from said bottom wall, said perimeter wall having a rear side a front side, a first lateral side and a second lateral side, each of said first lateral side and said second lateral side having a first portion angling outwardly from said rear side, each of said first lateral side and said second lateral side having a second portion angling inwardly between said first portion and said front side, said rear portion having a length being greater than said second portion, said perimeter wall having a distal edge with respect to said bottom wall to define an opening into said casket; and wherein each of said rods has a coupled end and a free end, said coupled end of each of said rods being coupled to an outside surface of said perimeter wall of said casket spaced above said bottom wall of said casket.

2. The assembly according to claim 1, wherein said insert has a basal wall and an exterior wall extending upwardly from said basal wall, said exterior wall conforming to said perimeter wall of said casket such that said insert is inhibited from moving when said insert is positioned in said casket.

3. The assembly according to claim 1, wherein said lid has a top surface, a bottom surface and a perimeter edge extending between said top surface and said bottom surface, said perimeter edge having a back side, a front side, a first sidelong side and a second sidelong side, each of said first sidelong side and said second sidelong side having angled portions which conform to said first portion and said second portion of a respective one of said first lateral side and said second lateral side of said casket, said perimeter edge angling inwardly between said bottom surface and said top surface, said bottom surface resting on said distal edge of said perimeter wall of said casket when said lid is positioned on said casket.

4. The assembly according to claim 1, further comprising:

said plurality of rods including a set of first rods, a set of second rods and a set of third rods; and wherein each of said first rods is positioned on said first portion of a respective one of said first lateral side and said second lateral side of said perimeter wall, each of said first rods being positioned proximate said rear side of said perimeter wall.

5. The assembly according to claim 4, wherein each of said second rods is positioned on said first portion of a respective one of said first lateral side and said second lateral side of said perimeter wall, each of said second rods being positioned closer to said second portion of said respective first lateral side and said second lateral side than said rear side of perimeter wall.

6. The assembly according to claim 5, each of said third rods is positioned on said second portion of a respective one of said first lateral side and said second lateral side, each of said third rods being centrally positioned proximate said front side of said perimeter wall.

7. The assembly according to claim 1, further comprising:

said plurality of rods including a set of first rods, a set of second rods and a set of third rods; and wherein each of said first rods, said second rods and said third rods has a unique length with respect to each other such that said free end of each of said rods being positioned on said first lateral side of said perimeter wall are aligned with each other and said free end of each of said rods being positioned on said second lateral side of said perimeter wall are aligned with each other.

8. The assembly according to claim 1, further comprising a plurality of ornaments, each of said ornaments being comprised of pressed cannabis thereby facilitating said ornaments to decompose after a sufficient duration of time, said plurality of ornaments including a plurality of sets of ornaments, each of said sets of ornaments having a unique structure with respect to each other, respective ones of said ornaments being chosen by a user and positionable at a gravesite at which said casket and said insert and said lid are buried wherein said respective ornaments are configured to enhance the ornamental appearance of the gravesite.

9. The assembly according to claim 1, further comprising an urn being comprised of pressed cannabis thereby facilitating said urn to decompose after a sufficient duration of time wherein said urn is configured to contain ashes of a cremated individual.

10. A biodegradable casket assembly for facilitating buried human remains to decompose and degrade, said assembly comprising:

a casket being comprised of pressed cannabis thereby facilitating said casket to decompose when said casket is buried with said human remains, said casket having a bottom wall and a perimeter wall extending upwardly from said bottom wall, said perimeter wall having a rear side, a front side, a first lateral side and a second lateral side, each of said first lateral side and said second lateral side having a first portion angling outwardly from said rear side, each of said first lateral side and said second lateral side having a second portion angling inwardly between said first portion and said front side, said rear portion having a length being greater than said second portion, said perimeter wall having a distal edge with respect to said bottom wall to define an opening into said casket;

an insert being insertable into said casket, said insert being comprised of a rigid material such that said insert imparts structural rigidity to said casket, said insert having a basal wall and an exterior wall extending upwardly from said basal wall, said exterior wall conforming to said perimeter wall of said casket such that said insert is inhibited from moving when said insert is positioned in said casket;

a lid being comprised of pressed cannabis thereby facilitating said lid to decompose when said lid and said casket are buried with said human remains, said lid having a top surface, a bottom surface and a perimeter edge extending between said top surface and said bottom surface, said perimeter edge having a back side, a front side, a first sidelong side and a second sidelong side, each of said first sidelong side and said second sidelong side having angled portions which conform to said first portion and said second portion of a respective one of said first lateral side and said second lateral side of said casket, said perimeter edge angling inwardly between said bottom surface and said top surface, said bottom surface resting on said distal edge of said perimeter wall of said casket when said lid is positioned on said casket;

a plurality of rods, each of said rods being coupled to and extending away from said casket wherein each of said rods is configured to be gripped for carrying said casket, each of said rods having a coupled end and a free end, said coupled end of each of said rods being coupled to an outside surface of said perimeter wall of said casket spaced above said bottom wall of said casket, said plurality of rods including a set of first rods, a set of second rods and a set of third rods, each of said first rods being positioned on said first portion of a respective one of said first lateral side and said second lateral side of said perimeter wall, each of said first rods being positioned proximate said rear side of said perimeter wall, each of said second rods being positioned on said first portion of a respective one of said first lateral side and said second lateral side of said perimeter wall, each of said second rods being positioned closer to said second portion of said respective first lateral side and said second lateral side than said rear side of perimeter wall, each of said third rods being positioned on said second portion of a respective one of said first lateral side and said second lateral side, each of said third rods being centrally positioned proximate said front side of said perimeter wall, each of said first rods, said second rods and said third rods having a unique length with respect to each other such that said free end of each of said rods being positioned on said first lateral side of said perimeter wall are aligned with each other and said free end of each of said rods being positioned on said second lateral side of said perimeter wall are aligned with each other;

a plurality of ornaments, each of said ornaments being comprised of pressed cannabis thereby facilitating said ornaments to decompose after a sufficient duration of time, said plurality of ornaments including a plurality of sets of ornaments, each of said sets of ornaments having a unique structure with respect to each other, respective ones of said ornaments being chosen by a user and positionable at a gravesite at which said casket and said insert and said lid are buried wherein said respective ornaments are configured to enhance the ornamental appearance of the gravesite; and an urn being comprised of pressed cannabis thereby facilitating said urn to decompose after a sufficient duration of time wherein said urn is configured to contain ashes of a cremated individual.

* * * * *